(12) United States Patent
Russ

(10) Patent No.: US 6,260,799 B1
(45) Date of Patent: Jul. 17, 2001

(54) AIRCRAFT WING FOLD ACTUATION SYSTEM

(75) Inventor: David E. Russ, Rockford, IL (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/556,578

(22) Filed: Apr. 24, 2000

(51) Int. Cl.[7] ............................................. B64C 3/56
(52) U.S. Cl. ................................................... 244/49
(58) Field of Search ..................... 244/49, 3.27, 3.28, 244/3.29, 7 R, 20, 22, 72, 35 R; 74/661, 665 Q

(56) References Cited

U.S. PATENT DOCUMENTS

| | | | |
|---|---|---|---|
| 2,044,357 | * | 6/1936 | Kerr ......................................... 244/49 |
| 2,289,224 | * | 7/1942 | Swanson et al. ........................ 244/49 |
| 2,468,425 | * | 4/1949 | Carpenter et al. ...................... 74/520 |
| 2,538,602 | * | 1/1951 | Taylor et al. ........................... 244/49 |
| 2,665,085 | * | 1/1954 | Crocombe et al. ..................... 244/49 |
| 4,778,129 | * | 10/1988 | Byford .................................... 244/49 |

* cited by examiner

Primary Examiner—Charles T. Jordan
Assistant Examiner—Christian M. Best
(74) Attorney, Agent, or Firm—Wood, Phillips, VanSanten, Clark & Mortimer

(57) ABSTRACT

A wing fold actuation system (24) is provided for folding an outboard wing section (18) relative to an inboard wing section (16) between a deployed position (20) and a stored position (22). The system (24) includes an actuator (26) in the form of a geared rotary actuator (30) in combination with a four-bar linkage (32). A locking mechanism (28) is provided to lock the outboard wing section (18) in the deployed position (20), and includes a catch on the outboard wing section (18) that is engageable with a rotary latch (42) on the inboard wing section (16). A timing transmission (46) connects the rotary actuator (30) with the rotary latch (42) to time the rotation of the rotary latch (42) with respect to the movement of the outboard wing section (18) between the deployed and stored positions (20,22).

14 Claims, 5 Drawing Sheets

AIRCRAFT WING FOLD ACTUATION SYSTEM

FIELD OF THE INVENTION

This invention relates to aircraft actuation systems and, more particularly, to aircraft wing fold actuation systems for folding an outboard wing section relative to an inboard wing section.

BACKGROUND OF THE INVENTION

Many modem day aircraft, especially military aircraft, are equipped with wings having sections that are folded between a spread or deployed position where the aircraft is operational and a folded or stored position that allows the aircraft to be stored in a space efficient manor. Examples of such aircraft include missiles that have folding wing sections to allow storage in a launch canister and carrier based airplanes that must fold their wings for compact storage on and below the carrier deck.

Typically, the mechanisms that fold the wings must securely lock the wings in the deployed position for flying and, in the case of carrier based aircraft, must lock the wing in the stored position so that it does not accidentally deploy to the spread position due to wind and other forces on the carrier deck. The air load on the wing creates large moments on such mechanisms in both the deployed and stored positions. As modem aircraft move towards thinner wing sections, the space available to react the large moments is becoming increasingly restricted.

For carrier based aircraft, one traditional approach for the folding mechanism is to have a series of geared rotary actuators staged one after another in a line along the cord of the wing to form a "piano hinge" arrangement. The geared rotary actuators react all the wing loads and moments through their internal components. This tends to increase both the complexity and weight of the rotary actuators. Often, the systems also include a plurality of latch pins mounted in one of the wing sections that extend into mating bores on the other wing section to lock wing sections together in the deployed position. However, these devices can bind during engagement or disengagement due to the relatively snug fits required to ensure a secure lock of the wing sections in the deployed position. In addition to inhibiting reliable operation, this binding can produce undesirable wear in the devices. Other wing fold systems have been proposed utilizing linkage mechanisms. However, while these systems may be suitable for their intended purpose, there is always room for improvement.

SUMMARY OF THE INVENTION

It is the principal object of the invention to provide a new and improved aircraft wing fold actuation system.

According to one embodiment of the invention, an aircraft wing fold actuation system is provided for folding an outboard wing section relative to an inboard wing section between a deployed position and a stored position. The system includes an actuatormounted on the inboard wing section, and a four-bar linkage connected between the inboard and outboard wing sections to drive the outboard wing section between the deployed and stored positions. The actuator includes a rotary output. The four-bar linkage includes a crank link connected to the rotary output to be rotated thereby about an axis, and a coupler link extended between the crank link and the outboard wing section. The coupler link is pivoted to the crank link and the outboard wing section to transmit a drive force from the crank link to the outboard wing section to drive the outboard wing section between the deployed and stored positions. The crank and coupler links are within 5° of crank link rotation of one of their toggle position with the outboard wing section in the deployed position and within 15° of their other toggle position with the outboard wing section in the stored position.

According to one facet of the invention, the wing fold actuation system includes a crank link pivoted to the inboard wing section at a first pivot point for rotation about an axis between first and second angular positions relative to the inboard wing section, a ground link extending between the inboard and outboard wing sections, a follower link connected to the outboard wing section for movement therewith relative to the inboard wing section between the deployed and stored positions, a coupler link extending between the crank link and the follower link, and a rotary actuator connected to the second link to transmit torque to the second link to pivot the second link between the first and second positions. The ground link is fixed to the inboard wing section to prevent relative movement therebetween. The outboard wing section is pivoted to the ground link at a second pivot point for movement between the deployed and stored positions. The second pivot point is spaced from the first pivot point. The coupler link is pivoted to the follower link at a third pivot point spaced from the second pivot point. The coupler link is pivoted to the crank link at a fourth pivot point spaced from the first and third pivot points. The crank and coupler links are within 5° of crank link rotation of a toggle position with the crank link in the first position and the outboard wing section in the deployed position. The crank and coupler links are within 15° of crank link rotation of another toggle position with the crank link in the second angular position and the outboard wing section in the stored position.

According to another facet of the invention, the system includes a catch fixed to the outboard wing member for movement therewith between the deployed and stored positions, a rotary latch mounted to the inboard wing member for rotation about an axis, and an actuator connected between the outboard wing section and the inboard wing section to drive the outboard wing section between the deployed and stored positions. The catch has a first cam surface, and the rotary latch has a second cam surface that is engaged with the first cam surface with the rotary latch in a first angular position and the outboard wing section in the deployed position to prevent movement of the outboard wing section from the deployed position toward the stored position. The system further includes a timing transmission connected between the actuator and the rotary latch to transmit drive torque from the actuator to rotate the rotary latch about the axis to and from the first angular position. The rotation is timed with the movement of the outboard wing section between the deployed and stored position so that the cam surfaces disengage as the actuator drives the outboard wing section from the deployed position toward the stored position and the cam surfaces engage as the actuator drives the outboard wing section from the stored position to the deployed position.

According to one facet of the invention, the actuator includes a geared rotary actuator having a rotary output, and the transmission includes a gear train connected between the rotary output and the rotary latch to transmit drive torque from the rotary output to the rotary latch.

According to yet another facet of the invention, the gear train includes a first gear connected to the rotary output for rotation therewith and a second gear connected to the rotary latch for rotation therewith about the axis of rotation for the rotary latch. The second gear is meshed with the first gear to be driven thereby.

Other objects and advantages will become apparent from the following specification taken in connection with the accompanying drawings.

DETAILED DESCRIPTION OF THE PREFERRED EMBODIMENTS

Figure 1:
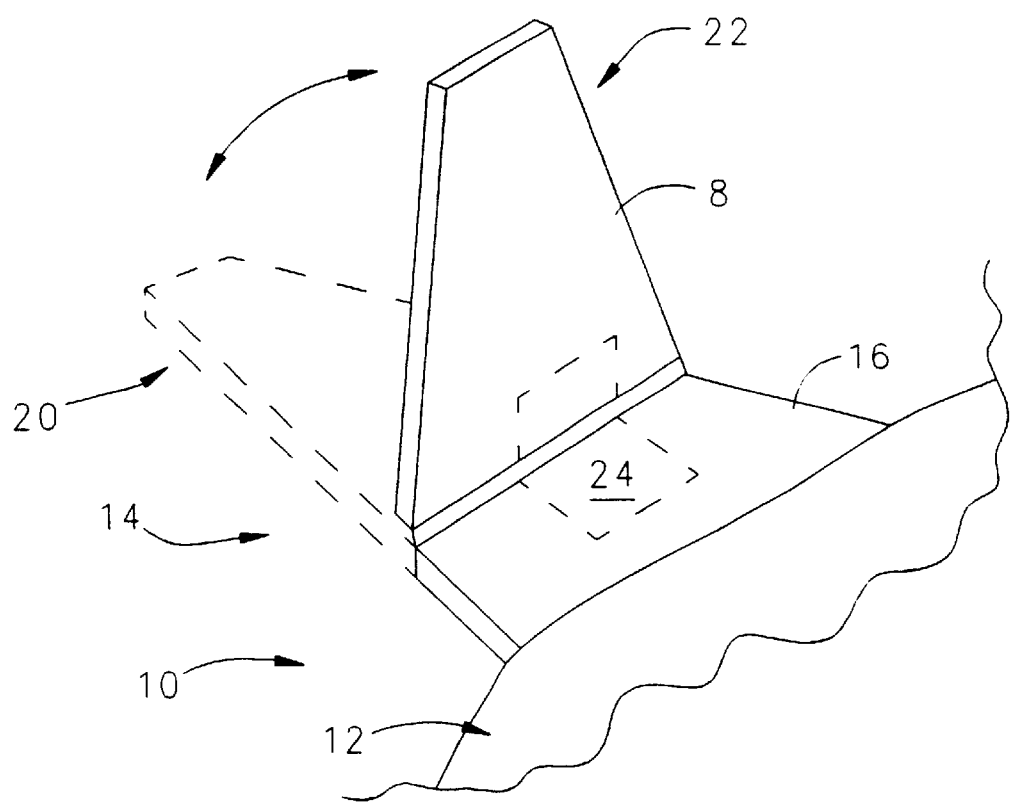
FIG. 1 is a perspective view of a folding wing of an aircraft incorporating the wing fold actuation system embodying the invention.

FIG. 1 illustrates an aircraft 10 including a fuselage 12 and a folding wing 14. The folding wing 14 includes an inboard wing section 16 and an outboard wing section 18 that folds between a spread or deployed position, as shown by the phantom lines at 20, and a folded or stored position, as shown by the solid lines at 22. The stored position 22 allows for the aircraft 10 to be safely and efficiently stored, while the deployed position 20 is the operational configuration of the wing 14 for flight of the aircraft 10. The aircraft 10 includes a wing fold actuation system 24 that is mounted completed within the wing 14, or partially in the wing 14 with the remainder in the fuselage 12.

Figure 2:
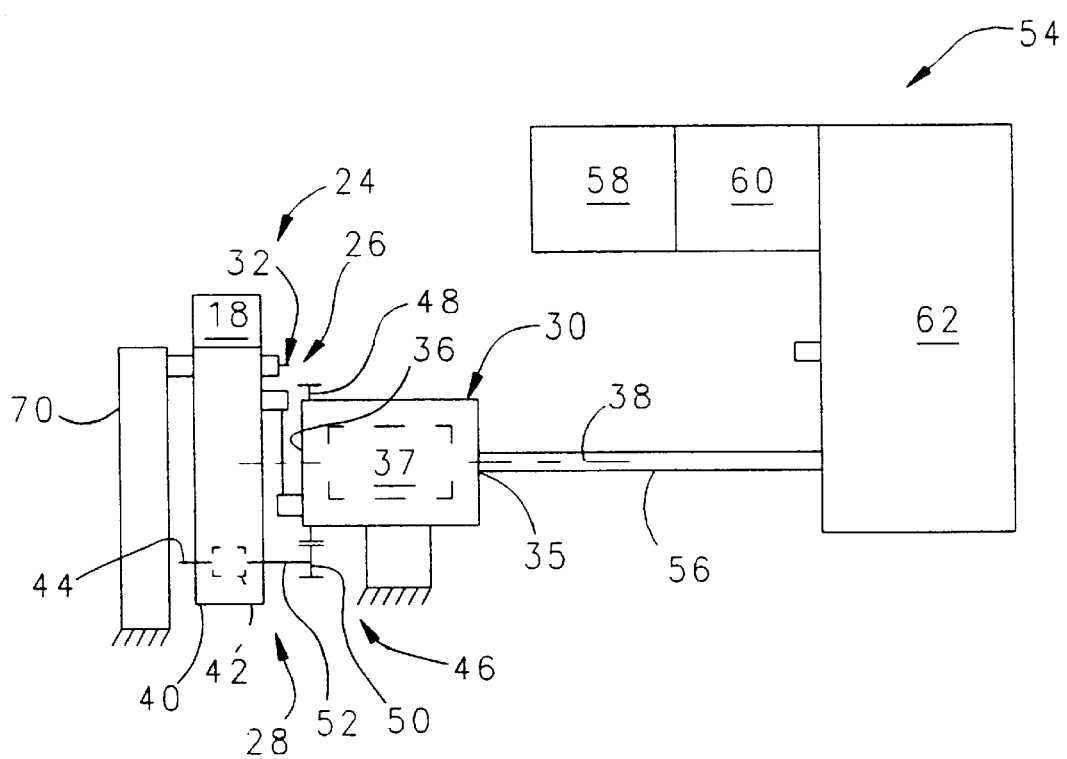
FIG. 2 is a diagrammatic illustration of the wing fold actuation system and associated components.

As best seen in FIG. 2. the wing fold actuation system 24 includes an actuator 26 connected between the outboard wing section 18 and the inboard wing section 16 to drive the outboard wing section between the deployed and stored positions 20 and 22, and a locking mechanism 28 that locks the outboard wing section 18 in the deployed position. In the preferred embodiment the actuator 26 is provided in the form of a geared rotary actuator 30 in combination with a four-bar linkage 32. The geared rotary actuator 30 includes a rotary input 35, a rotary output 36, and an epicyclic or planetary gear train 37 configured to increase the torque from the rotary input 35 to the rotary output 36. In the preferred embodiment, the rotary input 35 and the rotary output 36 are mounted for rotation about an axis 38. The locking mechanism 28 includes a catch 40 that is engageable with a rotary latch 42 that is mounted for rotation on the inboard wing section 16 about an axis 44. A timing transmission 46 connects the rotary output 36 with the rotary latch 42 to time the rotation of the rotary latch 42 about the axis 44 with respect to the rotation of the rotary output 36 and the movement of the outboard wing section 18 between the deployed and stored positions 20 and 22. In the illustrated embodiment, the timing transmission includes adrive gear 48 connected to the rotary output 36 for rotation therewith, and a driven gear 50 connected to the rotary latches 42 for rotation therewith about the axis 44 by a shaft 52. The driven gear 50 is meshed with the drive gear 48 to be driven thereby.

A power drive unit (PDU) 54 provides drive torque to the rotary input 35 of the actuator 30 through a drive shaft 56. Preferably, the PDU 54 includes an electric or hydraulic motor 58. a brake 60 and a reduction gear box 62 that transmits drive torque from the motor 58 to the drive shaft 56.

Because the specific details of the components 30, 35, 36, 37, 38, and 46–62 are highly dependent on the requirements of the particular aircraft in which they are applied, further description of the details of these components will not be provided for the sake of brevity.

Figure 3A:
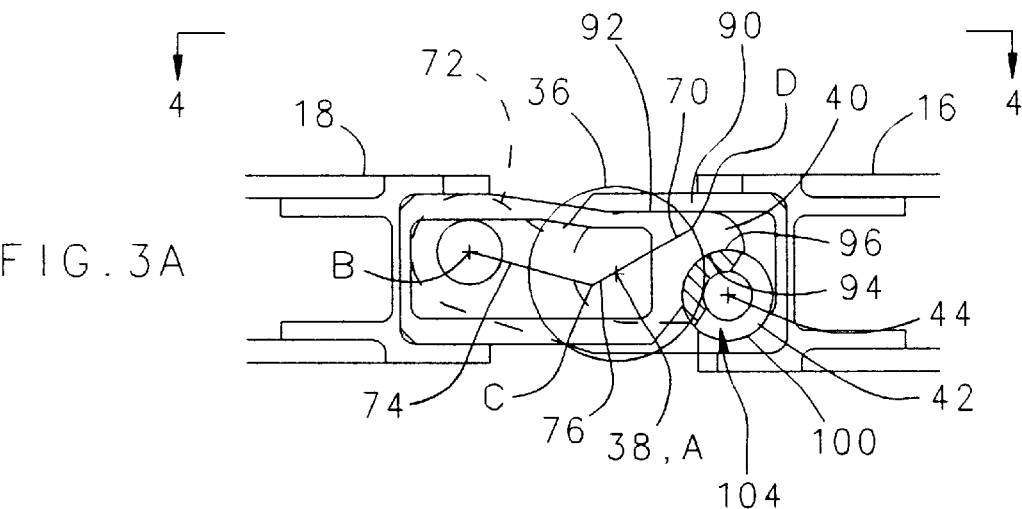
FIGS. 3A–3E are diagrammatic illustrations showing the operation of the wing fold actuation system.
Figure 3B:
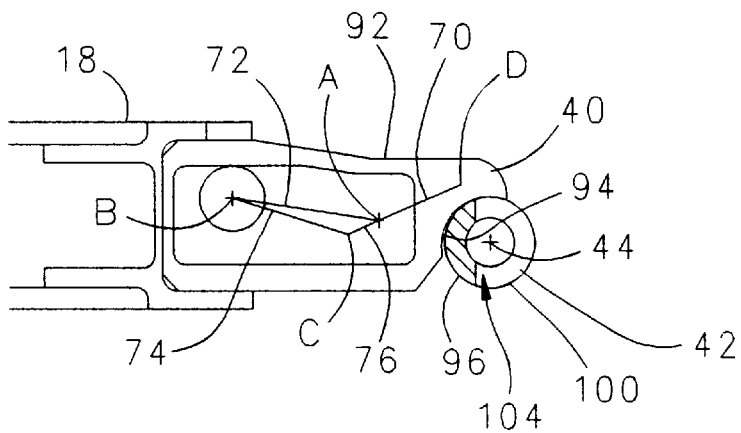
Figure 3C:
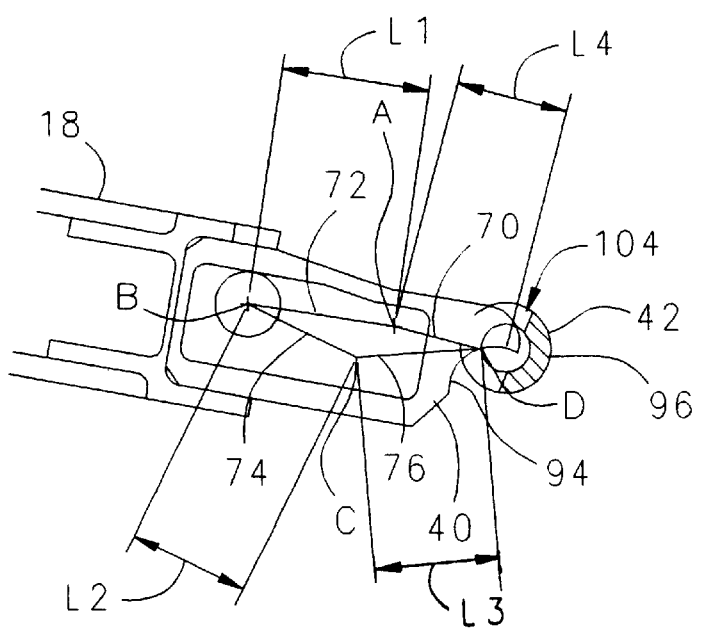
Figure 3D:
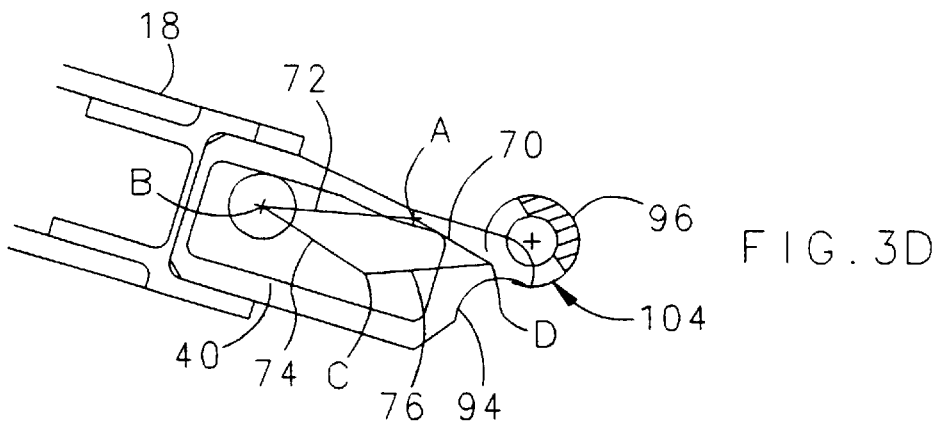
Figure 3E:
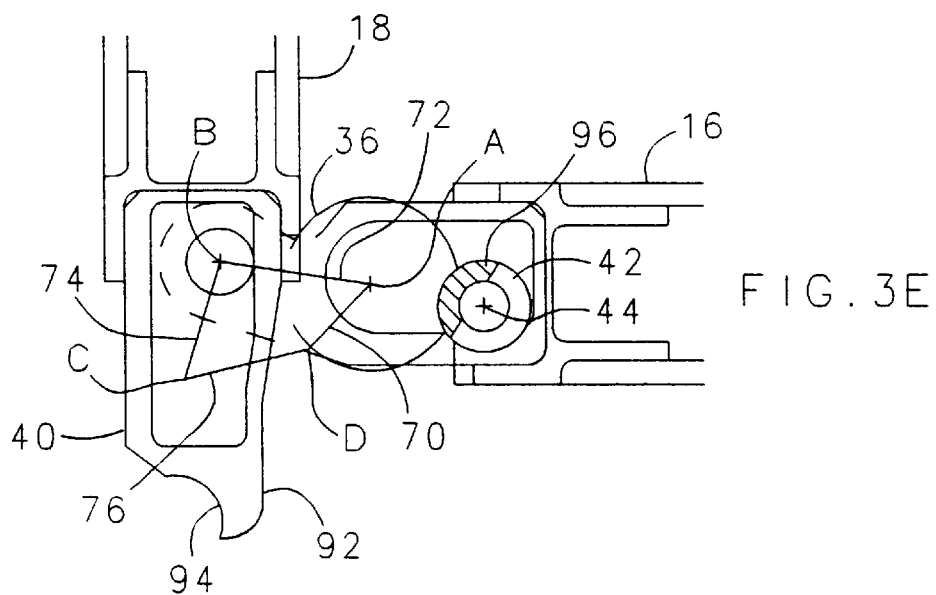

The operation of the wing fold actuation system 24 in moving the outward wing section 18 between the deployed position 20 and the stored position 22 is illustrated by the sequence of FIGS. 3A–3E. with FIG. 3A showing the system 24 with the outboard wing section 18 in the deployed position 20 and FIG. 3E showing the system 24 with the outboard wing section 18 in the stored position 22. The four-bar linkage 32 is shown schematically in FIGS. 3A–3E and includes a crank link 70, a ground link 72, a follower link 74, and a coupler link 76. The crank link 70 is pivoted to the inboard wing section 16 at a first pivot point A for rotation between a first angular position shown in FIG. 3A and a second angular position shown in FIG. 3E. In the illustrated embodiment, the first pivot point A corresponds to the rotational axis 38 of the rotary output 36, and the crank link 70 is connected to the rotary output 36 for rotation therewith about the axis 38. The ground link 72 (shown schematically in FIGS. 3B–3D) extends between the inboard and outboard wing sections 16 and 18. The ground link 72 is fixed to the inboard wing section 16 to prevent relative movement therebetween. The outboard wing section 18 is pivoted to the ground link 72 using a suitable pivot connection at a second pivot point B for movement between the deployed position shown in FIG. 3A and the stored position shown in FIG. 3E. In the illustrated embodiment, the pivot connection at the pivot point B is between the ground link 72 and the catch 40. However, in some applications it may be desirable to make the pivot connection with a component of the outboard wing section 18 other than the catch 40. The second pivot point B is spaced from the first pivot point A by an effective length L1 of the ground link 72. as best seen in FIG. 3C. The follower link 74 is connected to the outboard wing section 18 for movement therewith relative to the inboard wing section 16 between the deployed and stored positions. The coupler link 76 extends between the crank link 70 and the follower link 74. The coupler link 76 is pivoted to the follower link 74 using a suitable pivot connection at a third pivot point C spaced from the second pivot point B by an effective length L2 of the follower link 74 as best seen in FIG. 3C. The coupler link 76 is also pivoted to the crank link 70 at a fourth pivot point D spaced from the first pivot point A by an effective length L3 of the coupler link 76, and spaced from the third pivot point C by an effective length L4 of the crank link 70. The lengths L1, L2, L3 and L4 and the locations of the pivot points A and B are arranged so that the crank and coupler links 70 and 76 are within 5° of crank link rotation about pivot point A of an overcenter or toggle position when the crank link is in the first position shown in FIG. 3A and within 15° of crank link rotation about pivot point A of their other overcenter or toggle position when the crank link is in the second position shown in FIG. 3E. This serves to minimize the torque loading carried by the geared rotary actuator 30 and its components 35, 36, and 37 when the outboard wing section 18 is in the deployed position 20 and in the stored position 22. In this regard, it should be understood that the appropriate lengths L1, L2, L3 and L4 and location of the pivot points A and B required to place the crank and coupler links 70 and 76 within 5° and 15° of crank link rotation of their overcenter or toggle positions when the outboard wing section is in the deployed and stored positions. respectively, will vary depending on the particular aircraft to which the system 24 is applied. For example, in the illustrated embodiment, the outboard wing section 18 undergoes approximately 90° of rotation between the deployed and stored positions, while in other aircraft applications the outboard wing section may rotate more or less than 90°, in which case the links L1–L4 and locations of the pivot points A and B would be different from those illustrated in order to achieve the desired result. As used herein, the overcenter or toggle positions are the two positions of the four-bar linkage 32 where the coupler link 76 and the crank link 70 are aligned. i.e. the angle of intersection is zero, such that the mechanical advantage of the four-bar linkage 32 becomes theoretically infinite. See "Theory of Machines and Mechanisms", Shigley and Uicker, ©1980 by McGraw-Hill, Inc.

In addition to the catch 40 and the rotary latch 42, the locking mechanism 28 includes a stop 90 that is fixed to the inner wing section to prevent relative movement therebetween. In the illustrated embodiment, the stop 90 is formed as a unitary component with the ground link 72. As seen in FIG. 3A, the stop 90 engages a stop surface 92 on the catch 40 to prevent rotation (counterclockwise in FIG. 3A) of the outer wing section 18 past the deployed position 20. Because the length of the moment arm of the catch 40 from the pivot point B to the stop surface 92 is greater than the thickness of the wing 14, the moment reaction loads at the stop 90 and the stop surface 92 are reduced in comparison to many conventional wing fold systems. The catch 40 also includes a concave. arcuate cam surface 94 that engages a nominally conforming convex. arcuate cam surface 96 on the rotary latch 42 when the rotary latch 42 is in a first angular position and the outer wing section 18 is in the deployed position, as shown in FIG. 3A. Preferably, the rotary latch has a nominally cylindrical body 100. with the cam surface 94 defined by part of the outer cylindrical surface of the body 100. The cylindrical body 100 includes a relief. shown generally at 104, that allows clearance between the rotary latch 42 and the catch 40 as the outboard wing section 18 rotates between the deployed and stored positions, as best seen in FIGS. 3A–3E.

As shown by FIGS. 3A–3E, the rotation of the rotary latch 42 about the axis 44 is timed with the movement of the rotation of the crank link 70 about the pivot point A and the movement of the outboard wing section 18 between the deployed and stored positions by the timing transmission 46. The relative pitch diameters of the gears 48 and 50 rotates the rotary latch 42 about its axis 44 at a higher rate of rotation than the rate of rotation for the crank link 70 about the pivot point A and the outboard wing section 18 about the pivot point B. The timing of these rotations is such that the cam surfaces 94 and 96 disengage as the actuator 26 drives the outboard wing section 18 from the deployed position toward the stored position, as shown by the sequence of FIGS. 3A, 3B, 3C and 3D; and the cam surfaces 94 and 96 engage as the actuator 26 drives the outboard wing section 18 from the stored position into the deployed position, as shown by the sequence of FIGS. 3E, 3D, 3C, 3B and 3A. In one preferred embodiment, as shown by the sequence of FIGS. 3B to 3A. the engagement of the cam surfaces 94 and 96 begins before the outboard wing section 18 is in the deployed position and the rotary latch 42 is in the first angular position, and the continued rotation of the latch 42 operates to force or snug the stop surface 92 against the stop 90 when the outboard wing section 18 reaches the deployed position and the latch 42 reaches the first angular position. This result is achieved by appropriate spacing between the stop surface 92 and the cam surface 94 and between the stop 90 and the cam surface 96. In another preferred embodiment, there is a slight clearance. on the order of 0.001", between the cam surfaces 94 and 96 when the stop surface 92 is abutted against the stop 90. so that the cam surfaces 94 and 96 will abut with slight movement of the outboard wing section 18 in the deployed position. This allows the latch 42 to rotate relatively freely with a minimum amount of wear between the cam surfaces 94 and 96. Regardless of whether the cam surfaces 94 and 96 are "snug" or have a slight clearance, the weight of the outboard wing section 16 is reacted between the stop 90 and stop surface 92, which allows relatively free rotation of the rotary latch with a minimum amount of wear compared to the latch pin devices discussed in the Background section.

Additionally, as seen in FIG. 3A, when the outboard wing section 18 is in the deployed position and the crank link 70 is in the first position, the crank link 70 and the coupler link 76 have moved slightly past their toggle position so that, with reference to the orientation shown at FIG. 3A, clockwise moments on the outboard wing section 18 will tend to rotate the crank link 70 and the rotary output 36 in the counterclockwise direction which in turn produces a clockwise rotation of the rotary latch 42 that is resisted by the engagement of the cam surfaces 94 and 96 and the stop surfaces 90 and 92. Thus, in the deployed position, both clockwise and counterclockwise moments on the outer wing section 18 tend to be either completely or almost completely reacted through the stop 90 and/or cam surfaces 94 and 96, rather than through the rotary actuator 30, drive shaft 56, gear box 62 and brake 60, thereby allowing the components 30, 56, 62 and 60 to be optimized for size and weight.

Furthermore, because the torque load transmitted through the geared rotary actuator 30 has been minimized by the arrangment of the four bar linkage 32 when the outboard wing section is in the deployed position, it is possible for the geared rotary actuator 30 to be designed as a so-called "irreversible" gear train with a back driving deficiency that will hold the outboard wing section 18 in the stored position for additional locking redundancy.

Preferably, the brake 60 is engaged with the outboard wing section in the deployed position to prevent movement of the outboard wing section 18 from the deployed position for additional locking redundancy.

With respect to locking the outboard wing section in the stored position shown in FIG. 3E so that wind and other force generated moments on the outboard wing section 18 do not move the outboard wing section 18 from the stored position, the positioning of the crank link 70 and the coupler link 76 within 15° of crank link rotation of their toggle position minimizes the torque load that is transmitted through the geared rotary actuator 30 as a result of the moments on the outboard wing section 18. This allows the brake 60 to be engaged to hold the outboard wing section 18 in the stored position, while also allowing the size and weight of the drive shaft 56, gear box 62 and brake 60 to be optimized. Furthermore, because the torque load transmitted to the geared rotary actuator 30 has been minimized by the arrangement of the four bar linkage 32 when the outboard wing section is in the stored position, it is possible for the geared rotary actuator 30 to be designed with a backdriving efficiency that will hold the outboard wing section 18 in the stored position for additional locking redundancy.

As shown by the foregoing description, in one preferred embodiment there are four features working to prevent inadvertent movement of the outboard wing surface 18 from the stored and deployed positions: (1) cam surfaces 94 and 96 in combination with the stop 90 and stop surface 92, (2) the toggle positions of the crank and coupler links 70 and 76, (3) the irreversibility of the geared rotary actuator 30, and (4) the mechanical brake 60. The combination of so many motion inhibiting features greatly reduces, if not eliminates, the possibility of accidental movements of the outboard wing section 18 from the stored and deployed positions.

Figure 4:
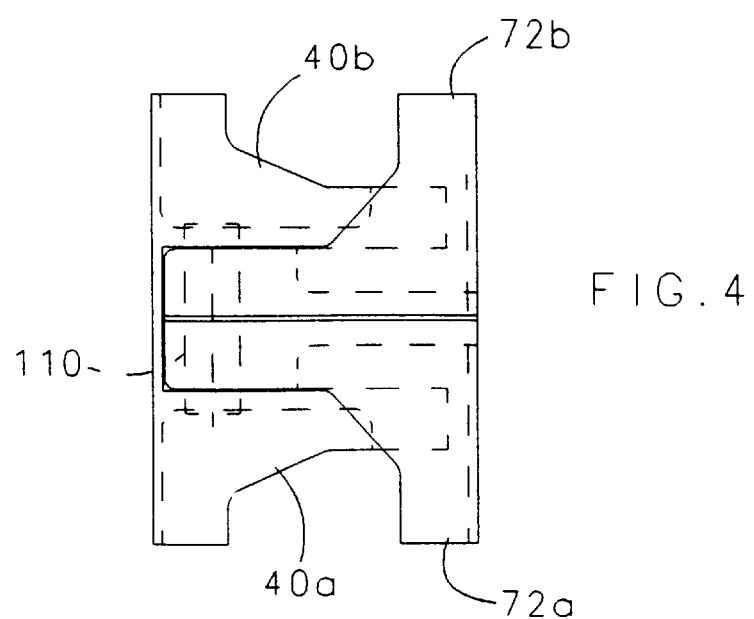
FIG. 4 is a view taken from line 4—4 in FIG. 3A showing selected link components of the wing fold actuation system.

FIG. 4 is a plan view showing one preferred embodiment having redundant catches 40a and 40b connected to redundant ground links 72a and 72b by a suitable pivot connection 110. Although not shown. this embodiment would also utilize redundant rotary latches 40.

Figure 5:
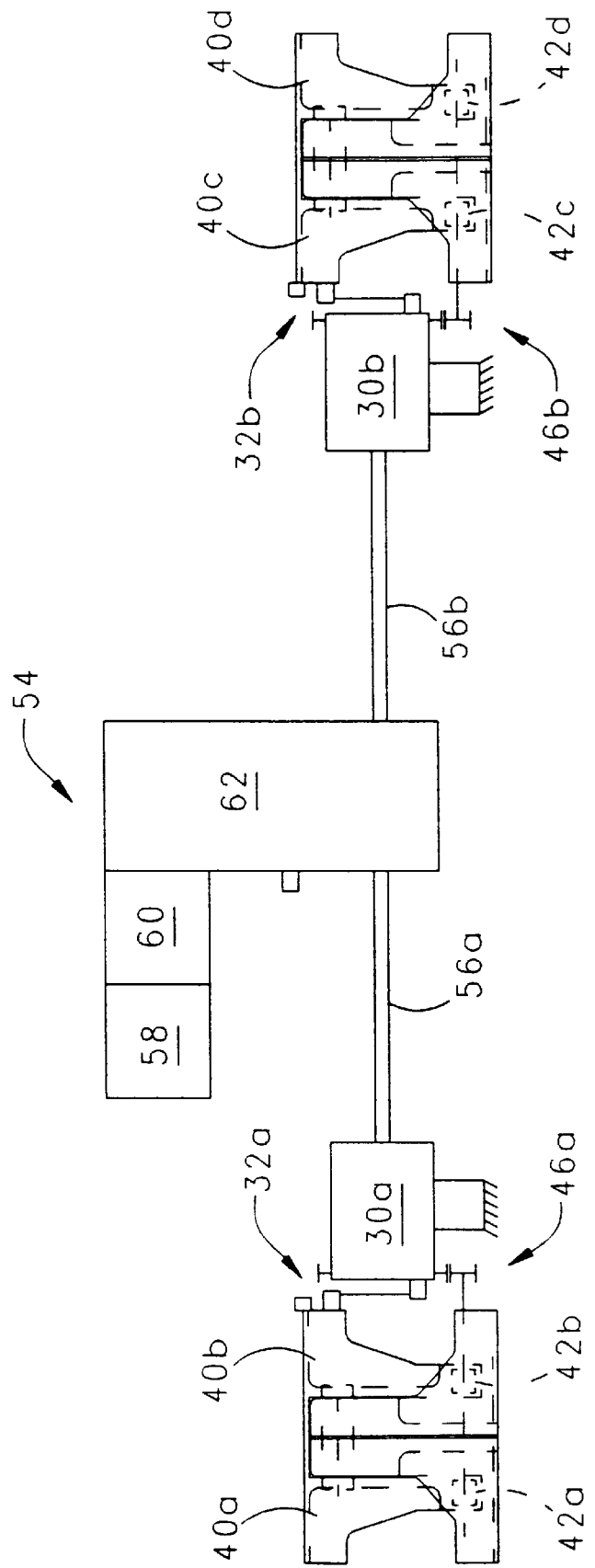
FIG. 5 is a diagrammatic illustration similar to FIG. 2 showing a highly redundant wing fold actuation system and associated components.

FIG. 5 shows one preferred embodiment having redundant drive shafts 56a and 56b, redundant rotary actuators 30a and 30b, redundant four-bar linkages 32a and 32b, redundant timing transmissions 46a and 46b, redundant rotary latches 42a, 42b, 42c and 42d, and redundant catches 40a. 40b, 40c and 40d. This embodiment prevents any single failure from allowing accidental movement of the outboard wing section 18 from the stored and deployed positions.

While preferred embodiments of the invention have been disclosed, there are many possible modifications to the disclosed embodiments that are contemplated within the scope of the invention. or example, while the illustrated combination of the actuator 26 and locking mechanism 28 is referred, it may be desirable in some applications to substitute an alternate form of actuator, such alternate form for the locking mechanism 28 for use with the illustrated actuator 26. As another example, while a preferred form of the timing transmission 46 has been illustrated, in some applications it may be desirable to use other forms of timing transmissions, such as a timing chain/sprocket arrangement or a multi-stage gear reduction arrangement. Similarly, while the disclosed convex and concave shapes of the cam surfaces 94 and 96 are preferred, it may be desirable in some applications to utilize other shapes for the cam surfaces, which, for example, may not be arcuate and/or may not be conforming. As yet another example, while it is preferred to use a geared rotary actuator 30, it may be desirable in some applications to utilize other rotary actuators or linkage mechanisms to drive the crank link 70 about the pivot point A. By way of further example, it may be desirable in some applications for the pivot point A to be at a location on the inner wing section 16 that is not coaxial with the rotational axis of the rotary output 36. It should also be understood that while the ground link 72 has been shown as a separate component that has been integrated with the inboard wing section 16, in some applications it may be desirable to form the ground link 72 as part of a one piece construction with the inboard wing section 16. Similarly, while the catch 40 and the follower link 74 have been illustrated as separate components that have been integrated with the outboard wing section 18, it may be desirable in some applications to form these components as part of a one piece construction with the outboard wing section 18.

What is claimed is:

1. An aircraft wing fold actuation system for folding an outboard wing section relative to an inboard wing section between a deployed position and a stored position, the system comprising:

a crank link pivoted to the inboard wing section at a first pivot point for rotation about an axis between first and second angular positions relative to the inboard wing section;

a ground link extending between the inboard and outboard wing sections, the ground link being fixed to the inboard wing section to prevent relative movement therebetween, the outboard wing section being pivoted to the ground link at a second pivot point for movement between the deployed and stored positions, the second pivot point being spaced from the first pivot point;

a follower link connected to the outboard wing section for movement therewith relative to the inboard wing section between the deployed and stored positions;

a coupler link extending between the crank link and the follower link, the coupler link pivoted to the follower link at a third pivot point spaced from the second pivot point, the coupler link pivoted to the crank link at a forth pivot point spaced from the first and third pivot points, the crank and coupler links being within 5° of crank link rotation of a toggle position with the crank link in the first position and the outboard wing section in the deployed position, the crank and coupler links being within 15° of crank link rotation of another toggle position with the crank link in the second position and the outboard wing section in the stored position; and an actuator having an output drivingly connected to the second link to transmit torque to the second link to pivot the second link between the first and second positions.

2. The system of claim 1 wherein the output is a rotary output and the second link is fixed to the rotary output for rotation therewith about said axis.

3. The system of claim 2 wherein said actuator is a geared rotary actuator.

4. The system of claim 1 further comprising:

a catch fixed to the outboard wing member for movement therewith between the deployed and stored positions, the catch having a first cam surface, a rotary latch mounted to the inboard wing member for rotation about a second axis, the rotary latch having a second cam surface that engages with the first cam surface with the rotary latch in a third angular position and the outboard wing section in the deployed position to prevent movement of the outboard wing section from the deployed position toward the stored position; and a timing transmission connected between the actuator and the rotary latch to transmit drive torque from the actuator to rotate the rotary latch about the second axis to and from the third angular position, said rotation timed with the movement of the outboard wing section between the deployed and stored positions so that the cam surfaces disengage as the actuator drives the outboard wing section from the deployed position toward the stored position and the cam surfaces engage as the actuator drives the outboard wing section from the stored position to the deployed position.

5. The system of claim 4 further comprising a stop fixed on the inboard wing section to prevent movement relative thereto, the stop positioned to abut the catch with the outboard wing surface in the deployed position.

6. An aircraft wing fold actuation system for folding an outboard wing section relative to an inboard wing section between a deployed position and a stored position, the system comprising:

a catch fixed to the outboard wing member for movement therewith between the deployed and stored positions, the catch having a first cam surface, a rotary latch mounted to the inboard wing member for rotation about an axis, the rotary latch having a second cam surface that is engaged with the first cam surface with the rotary latch in a first angular position and the outboard wing section in the deployed position to prevent movement of the outboard wing section from the deployed position toward the stored position;

an actuator connected between the outboard wing section and the inboard wing section to drive the outboard wing section between the deployed and stored positions; and a timing transmission connected between the actuator and the rotary latch to transmit drive torque from the actuator to rotate the rotary latch about the axis to and from the first angular position, said rotation timed with the movement of the catch and the outboard wing section between the deployed and stored positions so that the cam surfaces disengage as the actuator drives the outboard wing section from the deployed position toward the stored position and the cam surfaces engage as the actuator drives the outboard wing section from the stored position to the deployed position.

7. The system of claim 6 wherein the actuator comprises a geared rotary actuator having a rotary output, and the transmission comprises a gear train connected between the rotary output and the rotary latch to transmit drive torque from the rotary output to the rotary latch.

8. The system of claim 7 wherein the gear train comprises a first gear connected to the rotary output for rotation therewith, and a second gear connected to the rotary latch for rotation therewith, the second gear being meshed with the first gear to be driven thereby.

9. The system of claim 6 wherein the second cam surface is convex and the first cam surface is concave and nominally conforms to the second cam surface.

10. The system of claim 6 further comprising a stop fixed on the inboard wing section to prevent movement relative thereto, the stop positioned to abut the catch with the outboard wing surface in the deployed position.

11. An aircraft wing fold actuation system for folding an outboard wing section relative to an inboard wing section between a deployed position and a stored position, the system comprising:

an actuator mounted on the inboard wing section and including a rotary output; and a four-bar linkage connected between the inboard and outboard wing sections to drive the outboard wing section between the deployed and stored positions, the four-bar linkage including a crank link connected to the rotary output to be rotated thereby about an axis, and a coupler link extending between the crank link and the outboard wing section, the coupler link pivoted to the crank link and the outboard wing section to transmit a drive force from the crank link to the outboard wing section to drive the outboard wing section between the deployed and stored positions, the crank and coupler links being within 5° of crank link rotation of a toggle position with the outboard wing section in the deployed position and within 15° of crank link rotation of another toggle position with the outboard wing section in the stored position.

12. The system of claim 11 wherein said actuator is a geared rotary actuator.

13. The system of claim 11 further comprising:

a catch fixed to the outboard wing member for movement therewith between the deployed and stored positions, the catch having a first cam surface, a rotary latch mounted to the inboard wing member for rotation about a second axis, the rotary latch having a second cam surface that is engaged with the first cam surface with the rotary latch in a third angular position and the outboard wing section in the deployed position to prevent movement of the outboard wing section from the deployed position toward the stored position; and a timing transmission connected between the actuator and the rotary latch to transmit drive torque from the actuator to rotate the rotary latch about the second axis to and from the third angular position, said rotation timed with the movement of the outboard wing section between the deployed and stored positions so that the cam surfaces disengage as the actuator drives the outboard wing section from the deployed position toward the stored position and the cam surfaces engage as the actuator drives the outboard wing section from the stored position to the deployed position.

14. The system of claim 13 further comprising a stop fixed on the inboard wing section to prevent movement relative thereto, the stop positioned to abut the catch with the outboard wing surface in the deployed position.

* * * * *

UNITED STATES PATENT AND TRADEMARK OFFICE
CERTIFICATE OF CORRECTION

PATENT NO. : 6,260,799 B1  
APPLICATION NO. : 09/556578  
DATED : July 17, 2001  
INVENTOR(S) : David E. Russ Page 1 of 1

It is certified that error appears in the above-identified patent and that said Letters Patent is hereby corrected as shown below:

On Title page (item 73)

Assignee should read
-- Hamilton Sundstrand Corporation, Windsor Locks, CT --

Signed and Sealed this

Fifteenth Day of January, 2008

JON W. DUDAS  
*Director of the United States Patent and Trademark Office*